Figure 1:
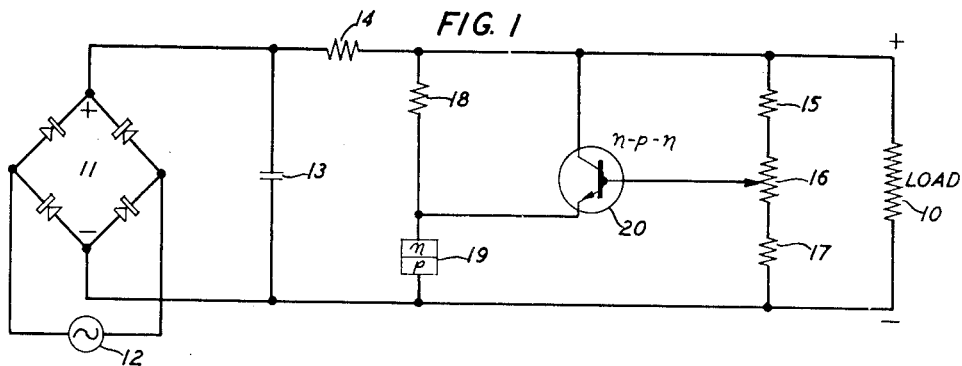

June 19, 1956 — F. H. CHASE — 2,751,550
CURRENT SUPPLY APPARATUS
Filed Oct. 12, 1953 — 2 Sheets-Sheet 1

INVENTOR
F. H. CHASE
BY
*G. F. Heuerman*
ATTORNEY

INVENTOR
F. H. CHASE
BY
*G. F. Heuerman*
ATTORNEY

United States Patent Office 2,751,550

Patented June 19, 1956

2,751,550

CURRENT SUPPLY APPARATUS

Fay H. Chase, Short Hills, N. J., assignor to Bell Telephone Laboratories, Incorporated, New York, N. Y., a corporation of New York Application October 12, 1953, Serial No. 385,570

1 Claim. (Cl. 323—66)

This invention relates to current supply apparatus and more particularly to apparatus for controlling the supply of current from a current source to a load to minimize changes of load voltage.

An object of the invention is to provide an improved circuit including one or more transistors to set up across a load a substantially constant voltage having a desired magnitude.

Current supply circuits which are similar in certain respects to the current supply circuits shown and described herein are disclosed in my application Serial No. 341,519, filed March 10, 1953.

In a specific embodiment of the invention herein shown and described for the purpose of illustration, direct current is supplied to a load from a supply source having resistance. For example, the supply source may comprise a bridge rectifier and a resistance path through which the direct current is supplied to the load. There is provided a transistor having a collector, an emitter and a base, the collector being directly, conductively connected to a terminal of the load so that the collector is at substantially the same potential as the potential of said load terminal. There is supplied from the load circuit through the base-emitter junction of the transistor a regulating current for producing amplified changes of collector current flowing through the series resistance of the current supply source and thereby causing voltage changes across the load to be minimized. When a single transistor is provided, one of the base and emitter electrodes is connected to a terminal of the load through a constant voltage device, such as a voltage stabilized diode. The other of the base and emitter electrodes is connected to a terminal of a voltage divider intermediate its end terminals, which end terminals may be connected to the load terminals respectively. Preferably, however, one end terminal of the voltage divider is connected to a first load terminal and the other end terminal of the voltage divider is connected to a terminal of the resistance path intermediate its end terminals, which end terminals of the resistance path are connected to a terminal of the rectifier and to the second load terminal respectively. A thermistor is preferably provided in the voltage divider to minimize load voltage changes due to ambient temperature changes.

When a single transistor is employed in the regulating circuit most of the regulating current flowing into or out of the transistor and through the resistance path in series with the rectifier and the load flows through the constant voltage device, thereby producing a voltage change across the constant voltage device. This undesirable effect may be avoided by employing a plurality of transistors in the regulating circuit and designing the circuit so that only a small portion of the regulating current flows through the constant voltage device. In a preferred arrangement of this type, the collector and emitter of the final current amplifier are directly conductively connected to the load terminals, respectively, and its base is directly, conductively connected to the collector of a preceding transistor. When three transistors are provided the emitter of the second transistor is conductively connected to a load terminal and its base is conductively connected to the collector of the first transistor. One of the base and emitter electrodes of the first transistor is connected through a constant voltage device to a load terminal and the other of the base and emitter electrodes is connected to a tap of a voltage divider which, in turn, is connected across the load.

Figs. 1 to 7 are schematic views of circuits embodying the invention, said circuits employing one or more transistors for regulating the supply of current from a current source to a load to minimize load voltage changes.

Referring to Fig. 1 of the drawing, there is provided for supplying direct current to a load 10 a direct-current supply source having resistance. The direct-current source comprises a bridge rectifier 11 having its input terminals connected to an alternating-current source 12, a filtering condenser 13 connected across the rectifier output terminals and a resistor 14. While in some cases the resistor 14 may not be required, ordinarily the resistance of the circuit including the elements of the rectifier bridge is not sufficient and the additional resistance of the resistor 14 is required. Two shunt current paths are connected across the load. One of the shunt paths comprises in series a resistor 15, a potentiometer 16 and a resistor 17. The other shunt path comprises in series a resistor 18 and a constant voltage device, preferably a voltage stabilized diode or Zener diode 19. Zener diodes and their characteristics are disclosed in an application of W. Shockley, Serial No. 211,212 filed February 16, 1951, now Patent No. 2,714,702, August 2, 1955. A Zener diode is a p-n junction rectifier poled so that current flows through it in the inverse or high resistance direction. The resistor 18 has a resistance value such that the magnitude of the current through the diode exceeds the so-called Zener point so that the voltage drop across the diode will remain substantially constant irrespective of variations of current flowing through it.

There is provided an n-p-n type junction transistor 20 having a collector, an emitter and a base. The collector is directly, conductively connected to the positive load terminal so that the collector and the positive load terminal are at substantially the same potential. The base electrode is connected to the adjustable tap of potentiometer 16. The emitter is connected to the common terminal of resistor 18 and the diode 19. The resistor 18 is provided only to maintain the current flowing through the diode 19 in its inverse direction greater than the minimum required to reach the Zener point. If the transistor is operated so that its minimum emitter current is greater than the minimum current required for the diode 19 to reach the Zener point, the resistor 18 may be omitted. When the base is negative with respect to the emitter potential, the current flowing out of the base is equal to the current flowing into the collector minus the current flowing out of the emitter. When the base potential is positive with respect to the emitter potential, the current flowing into the base is equal to the current flowing out of the emitter minus the current flowing into the collector. Assuming the base potential to be positive with respect to the emitter potential, as the voltage across the load increases, for example, increased current flows from the positive terminal of rectifier 11, through resistor 14, resistor 15, and a portion of potentiometer 16 into the base and out of the emitter of transistor 20 and through the p-n junction device 19 to the negative terminal of the rectifier. As a result, there is an increase of current flowing from the positive terminal of rectifier 11 through resistor 14, into the collector and out of the emitter of transistor 20 and through the p-n junction device 19 to the negative rectifier terminal. The voltage drop in the direct-current supply circuit including the rectifier 11 and resistor 14 thus increases to minimize the assumed increase of load voltage. If the base potential is negative with respect to the emitter potential, an increase of load voltage will cause less current to flow out of the base and, as a result, increased current flows into the collector. In this case, one part of the current flowing into the collector flows out of the base and the remaining part of the current flowing into the collector flows out of the emitter.

Figure 2:
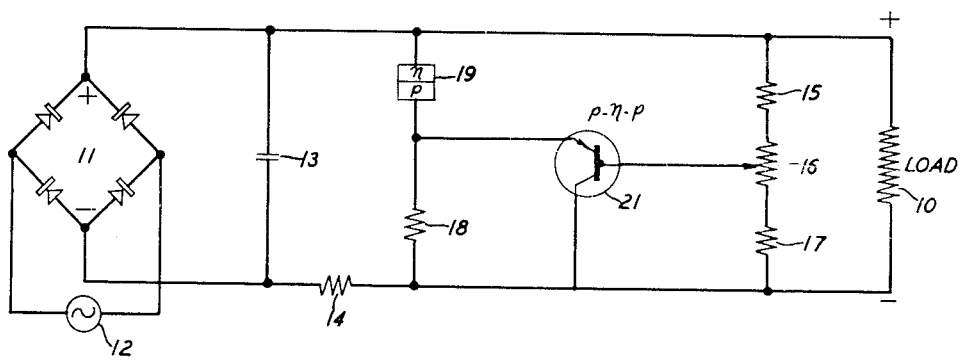

Fig. 2 shows a modification of the regulating circuit of Fig. 1 in which a p-n-p type transistor 21 is used instead of the n-p-n type transistor 20 of Fig. 1. The remaining parts of Fig. 2 are like the corresponding parts of Fig. 1 and are designated by the same numerals. In Fig. 2 the resistor 18 and the diode 19 are reversed with respect to the position of these elements in Fig. 1, that is, a terminal of the diode 19 is connected to the positive load terminal. The emitter and base electrodes of the transistor are connected as in Fig. 1 and the collector is connected to the negative load terminal. While the resistor 14 is shown connected in the line going from the negative load terminal to the negative terminal of the rectifier, it could have been shown in the positive line as in Fig. 1 since the resistor will function equally well in either position. In this case, when the base is negative with respect to the emitter potential, the current flowing out of the base is equal to the current flowing into the emitter minus the current flowing out of the collector. When the base is positive with respect to the emitter potential, the current flowing into the base is equal to the current flowing out of the collector minus the current flowing into the emitter. If the load voltage in Fig. 2 should increase, for example, the current flowing out of the base through a portion of potentiometer 16 and resistor 17 would increase or the current flowing into the base through resistor 15 and a portion of potentiometer 16 would decrease. In either case, the current flowing out of the collector and through resistor 14 to the negative terminal and the rectifier 11 would increase to cause the increase of voltage across the load to be minimized.

Figure 3:
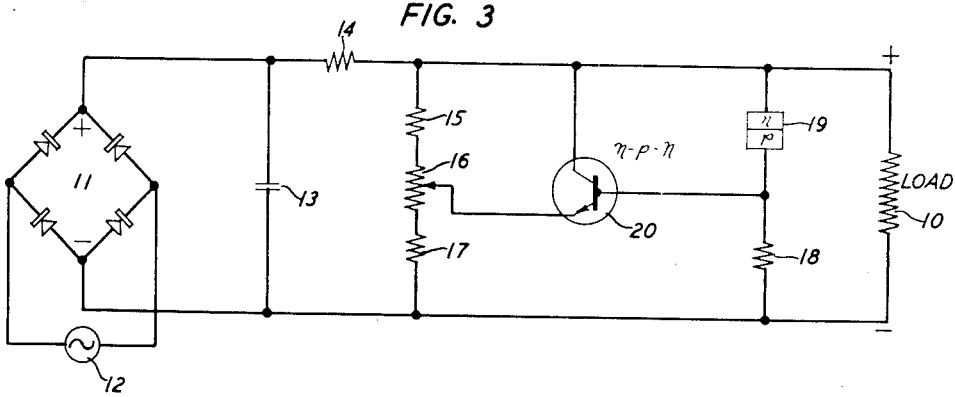

Fig. 3 shows a modification of Fig. 1. In Figs. 1 and 2 the emitter of the transistor is connected to the common terminal of resistor 18 and the p-n junction device 19. Fig. 3 is like Fig. 1 except that the base of transistor 20 is connected to the common terminal of the resistor 18 and the p-n junction device 19 and the emitter is connected to the adjustable tap of potentiometer 16, the positions of the resistor 18 and diode 19 being reversed with respect to the position of these elements in Fig. 1. Fig. 2 may be similarly modified. An increase of load voltage, for example, in Fig. 3, will increase the current flowing into the base of transistor 20, thus increasing the current flowing through rectifier 11 and resistor 14 into the collector. The increase of load voltage is thus minimized.

The regulating circuits of Figs. 1, 2 and 3 produce, across the load 10, a substantially constant voltage which is larger than the voltage across the constant voltage device 19 and which is adjustable to a desired value by means of the potentiometer 16. However, these circuits have the disadvantage that the percentage change of voltage across the load 10 is of the same order of magnitude as the percentage change of voltage which would appear across the load if only the series resistor 14 and the constant voltage diode 19 connected across the load were used for voltage regulating. That is, in these circuits the advantage of current amplification in the transistor is to a large extent lost. In Fig. 1, for example, if there is an increase of load voltage, the base becomes relatively more positive with respect to the emitter to increase the collector current flowing through resistor 14. The increase of collector current, however, results in an increased emitter current flowing through the diode 19. The voltage across the diode thus increases to make the base relatively more negative with respect to the emitter, thereby tending to reduce the collector current. Therefore, a change of load voltage produces a smaller change of current flowing through resistor 14 and the transistor than would be the case if the voltage across the diode did not change because of the change of emitter current flowing through it. In Fig. 2 likewise the current through the diode 19 changes when the regulating collector current flowing through resistor 14 changes. As a result the emitter-base voltage of the p-n-p transistor changes less in response to a certain load voltage change than would be the case if the current through the diode 19 and, therefore the voltage across it, were more nearly constant.

In Fig. 3 an increase of load voltage makes the emitter relatively more negative with respect to the base to increase the current flowing into the base and out of the emitter, thereby causing the collector current flowing through resistor 14 to increase. The increase of current flowing into the collector and out of the emitter produces an increased voltage drop across a portion of potentiometer 16 and resistor 17, thus making the emitter relatively more positive with respect to the base. Thus, in this circuit, the emitter current flowing through a portion of potentiometer 16 and resistor 17 limits the collector current which flows through resistor 14 to produce the regulating action.

Figure 4:
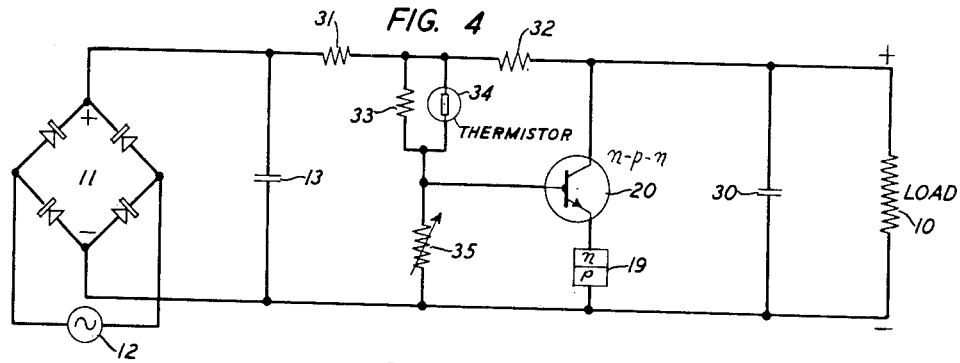

The circuit of Fig. 4 is an improvement over the circuits of Figs. 1, 2 and 3. This circuit differs from the circuit of Fig. 1 in the following respects: A shunt filtering condenser 30 is connected across the load 10. Such a condenser, of course, could also be provided in the regulating circuits shown in the other figures of the drawing, if required. The resistor 18 of Fig. 1 is omitted in Fig. 4 because the emitter current is sufficient to bring the diode 19 above the Zener point. Two resistors 31 and 32 are connected in series between the positive terminal of rectifier 11 and the positive terminal of the load 10 instead of the single resistor 14 of Fig. 1. In place of the voltage divider 15, 16, 17 of Fig. 1 there is employed in Fig. 4 a variable resistor 35 and in series therewith a thermistor 34 shunted by a resistor 33. One terminal of resistor 35 is connected to the negative terminal of rectifier 11 and the negative load terminal. The common terminal of resistors 33 and 35 and the thermistor 34 is connected to the base of transistor 20. Resistors 31, 32, 33 and thermistor 34 also have a common terminal.

In Fig. 4, because of the changes of voltage drop produced across each of resistors 31 and 32 in response to changes of collector current, the voltage changes across the voltage divider 33, 34, 35 are larger than the voltage changes across the load and smaller than the voltage changes across the output terminals of rectifier 11. If the rectifier output voltage increases, for example, the potential of the base of the transistor 20 will increase with respect to the potential of the emitter, thereby causing an increase of the current supplied from rectifier 11 through resistors 31 and 32 into the collector and out of the emitter of transistor 20. The voltage drop across resistors 31 and 32 thus increases to reduce or prevent an increase of the voltage across the load 10. By selecting resistors 31 and 32 of correct value and maintaining the load resistance constant, changes of rectifier output voltage will result in no change of load voltage. The thermistor 34 provides compensation for load voltage changes due to the effect of ambient temperature changes on the transistor 20 and the diode 19. Without the compensation, the load voltage would increase with increased temperature. The resistance of thermistor 34 decreases with increasing temperature to increase the voltage drop across resistor 35 thereby increasing the current flowing into the base and out of the emitter of transistor 20. The transistor collector current flowing through resistors 31 and 32 thus increases to minimize or substantially prevent the rise of load voltage due to the increase of ambient temperature.

The regulator of Fig. 4 provides good voltage regulation across the load 10 when the resistance of the load is substantially constant. By providing more than one transistor, as in the embodiments of Figs. 5, 6 and 7, the regulating circuit may be designed to give good load voltage regulation when the supply voltage, the load current, or both vary.

Figure 5:
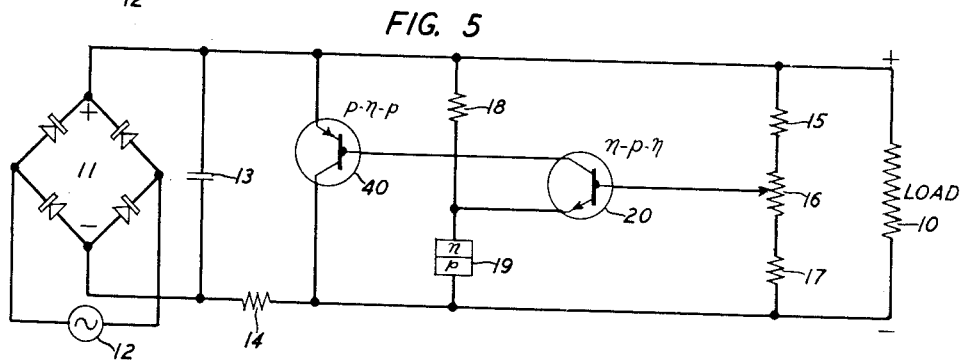

Fig. 5 is a modification of the embodiment of the invention shown in Fig. 1. In Fig. 5 there is provided an additional transistor 40 of the p-n-p type. The emitter of transistor 40 is connected to the positive load terminal and the collector of transistor 40 is connected to the negative load terminal. The collector of transistor 20, instead of being connected to the positive load terminal, as in Fig. 1, is connected directly to the base of transistor 40.

As the voltage across load 10 of Fig. 5 increases, for example, the base of transistor 20 becomes relatively more positive with respect to the emitter potential to cause the current flowing into the collector of transistor 20 to increase. This collector current of transistor 20 is the current flowing out of the base of transistor 40 and the increase of this base current produces an amplified increase of current flowing from the positive terminal of rectifier 11 into the emitter and out of the collector of transistor 40 and through resistor 14 to the negative rectifier terminal. The voltage drop across resistor 14 and the other resistance in the rectifier circuit thus increases to cause the assumed increase of load voltage to be minimized. It will be noted that in this embodiment of the invention only a small portion of the current which flows through the resistor 14 for regulating the load voltage also flows into the diode 19. This small current portion is the current which flows out of the emitter of transistor 20. The major portion of the regulating current is that which flows into the emitter and out of the collector of transistor 40. This is an important feature of the regulating circuit. Since an increase of current flowing through the diode 19 increases the voltage across the diode, any circuit arrangement which diverts a large portion of the regulating current from the constant voltage device 19 results in improved regulation.

Figure 6:
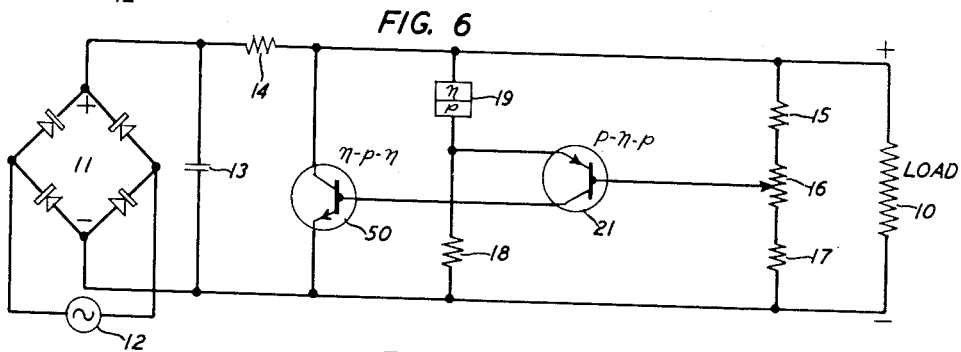

Fig. 6 is a modification of Fig. 2 in which there is added to the circuit of Fig. 2 a transistor amplifier stage comprising an n-p-n transistor 50. The collector of transistor 50 is connected to the positive load terminal, the emitter is connected to the negative load terminal and the base of transistor 50 is connected to the collector of transistor 21. In this embodiment, as in Fig. 5, most of the regulating current flowing through resistor 14 flows through the collector-emitter path of transistor 50 and does not flow through the p-n junction diode 19. The standard voltage across the diode 19 thus remains more precisely at a constant value and, therefore, the load voltage regulation is more precise.

Figure 7:
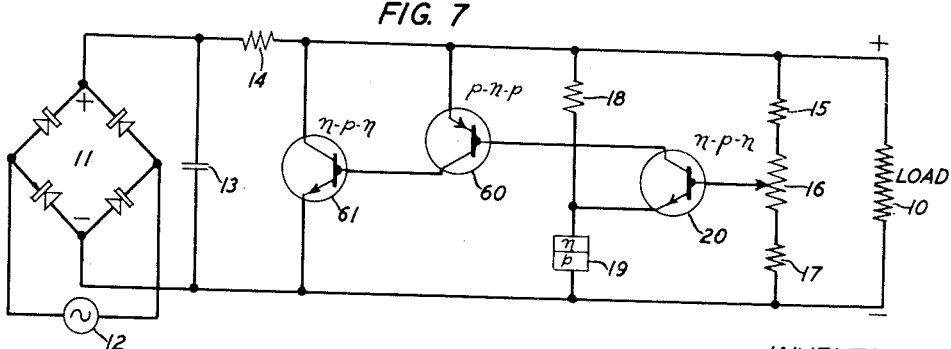

Fig. 7 is like Fig. 1 except that two stages of amplification comprising a p-n-p type transistor 60 and an n-p-n type transistor 61 have been added. The emitter of transistor 60 is connected to the positive load terminal. The collector of transistor 20 is connected to the base of transistor 60 and the collector of transistor 60 is connected to the base of transistor 61. The collector of transistor 61 is connected to the positive load terminal and the emitter of transistor 61 is connected to the negative load terminal. In this embodiment, as in the embodiment of Figs. 5 and 6, the major portion of the regulating current flows into the collector and out of the emitter of transistor 61 and does not flow through the diode 19. An increase of load voltage, for example, results in increased current flowing from the positive load terminal into the emitter and out of the base of transistor 60, into the collector and out of the emitter of transistor 20 and through the diode 19. The current is thus increased in the path from the positive load terminal into the emitter and out of the collector of transistor 60, into the base and out of the emitter of transistor 61. The current flowing through resistor 14 into the collector and out of the emitter of transistor 61 is thus increased to cause the load voltage increase to be minimized.

What is claimed is:

In combination, a first and a second resistor having a common terminal, means for supplying current from a direct-current source through said first and second resistors in series to a load, a voltage dividing resistance path having end terminals connected to a terminal of said load and to said common terminal respectively and having an intermediate terminal between said end terminals, a transistor having a collector, an emitter and a base, means for directly conductively connecting said collector to one terminal of said load, a constant voltage device, means for connecting said emitter through said constant voltage device to the other terminal of said load and means for connecting said base to said intermediate terminal, said voltage dividing resistance path comprising temperature responsive resistance means for minimizing changes of collector current due to ambient temperature changes.

References Cited in the file of this patent
UNITED STATES PATENTS

| | | |
|---|---|---|
| 2,106,793 | Burton | Feb. 1, 1938 |
| 2,372,432 | Keizer | Mar. 27, 1945 |
| 2,497,908 | Philpott | Feb. 21, 1950 |
| 2,645,750 | Goodwin | July 14, 1953 |
| 2,709,780 | Kircher | May 31, 1955 |